(12) United States Patent
Lang et al.

(10) Patent No.: US 11,973,372 B2
(45) Date of Patent: Apr. 30, 2024

(54) ELECTRIC MACHINE FOR DRIVING A MOTOR VEHICLE

(71) Applicant: ZF Friedrichshafen AG, Friedrichshafen (DE)

(72) Inventors: Martin Lang, Wegscheid (DE); Thomas Auer, Passau (DE); Maria Lang, Hauzenberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 84 days.

(21) Appl. No.: 17/554,709

(22) Filed: Dec. 17, 2021

(65) Prior Publication Data
US 2022/0200373 A1    Jun. 23, 2022

(30) Foreign Application Priority Data
Dec. 18, 2020   (DE) ..................... 10 2020 216 230.1

(51) Int. Cl.
| | |
|---|---|
| *H02K 1/20* | (2006.01) |
| *B60K 1/00* | (2006.01) |
| *H02K 1/32* | (2006.01) |
| *H02K 5/20* | (2006.01) |
| *H02K 9/02* | (2006.01) |
| *H02K 9/06* | (2006.01) |
| *H02K 9/19* | (2006.01) |

(52) U.S. Cl.
CPC .................. *H02K 1/20* (2013.01); *B60K 1/00* (2013.01); *H02K 1/32* (2013.01); *H02K 5/203* (2021.01); *H02K 5/207* (2021.01); *H02K 9/02* (2013.01); *H02K 9/06* (2013.01); *H02K 9/19* (2013.01); *B60K 2001/006* (2013.01)

(58) Field of Classification Search
CPC ............ H02K 1/20; H02K 1/32; H02K 5/203; H02K 5/207; H02K 9/02; H02K 9/06; H02K 9/19; H02K 3/24; H02K 5/04; B60K 1/00; B60K 2001/006; B60K 2001/001; B60K 11/02
USPC ...................................................... 310/52–57
See application file for complete search history.

(56) References Cited

U.S. PATENT DOCUMENTS

| | | | |
|---|---|---|---|
| 8,093,770 B1 * | 1/2012 | Berhan | H02K 9/19 310/58 |
| 2004/0000820 A1 * | 1/2004 | Cromas | H02K 9/12 310/58 |
| 2004/0001314 A1 * | 1/2004 | Bitsche | H02K 5/203 361/688 |

(Continued)

FOREIGN PATENT DOCUMENTS

| | | |
|---|---|---|
| DE | 29714740 U1 | 10/1997 |
| WO | WO 2019/008220 A1 | 1/2019 |
| WO | WO 2019008220 * | 1/2019 |

OTHER PUBLICATIONS

German Search Report DE 10 2020 216 230.1, dated Sep. 17, 2021. (12 pages).

*Primary Examiner* — Ahmed Elnakib
(74) *Attorney, Agent, or Firm* — Dority & Manning, P.A.

(57) ABSTRACT

An electric machine (1) for driving a motor vehicle includes a stator (2) having at least one winding overhang (9, 10). Cooling fluid is flowable in the area of the at least one winding overhang (9, 10) to receive heat from the at least one winding overhang (9, 10). Air is flowable in the area of the at least one winding overhang (9, 10) to receive heat from the cooling fluid.

11 Claims, 7 Drawing Sheets

(56) References Cited

U.S. PATENT DOCUMENTS

| | | | |
|---|---|---|---|
| 2006/0119196 A1* | 6/2006 | Konishi | H02K 3/24 |
| | | | 310/64 |
| 2008/0012436 A1* | 1/2008 | Neal | H02K 9/225 |
| | | | 310/90 |
| 2011/0241350 A1* | 10/2011 | Kori | H02K 1/20 |
| | | | 290/55 |
| 2011/0241458 A1 | 10/2011 | Rai et al. | |
| 2011/0304228 A1* | 12/2011 | Bradfield | H02K 5/18 |
| | | | 29/596 |
| 2012/0062056 A1* | 3/2012 | Bradfield | H02K 9/197 |
| | | | 310/58 |
| 2012/0286596 A1* | 11/2012 | Creviston | H02K 5/203 |
| | | | 310/59 |
| 2016/0033579 A1* | 2/2016 | Lampe | H02K 3/38 |
| | | | 310/68 B |
| 2016/0204680 A1 | 7/2016 | Noack et al. | |
| 2017/0310189 A1* | 10/2017 | Hanumalagutti | H02K 5/203 |
| 2022/0200372 A1* | 6/2022 | Lang | H02K 9/06 |
| 2022/0200373 A1* | 6/2022 | Lang | H02K 5/207 |

\* cited by examiner

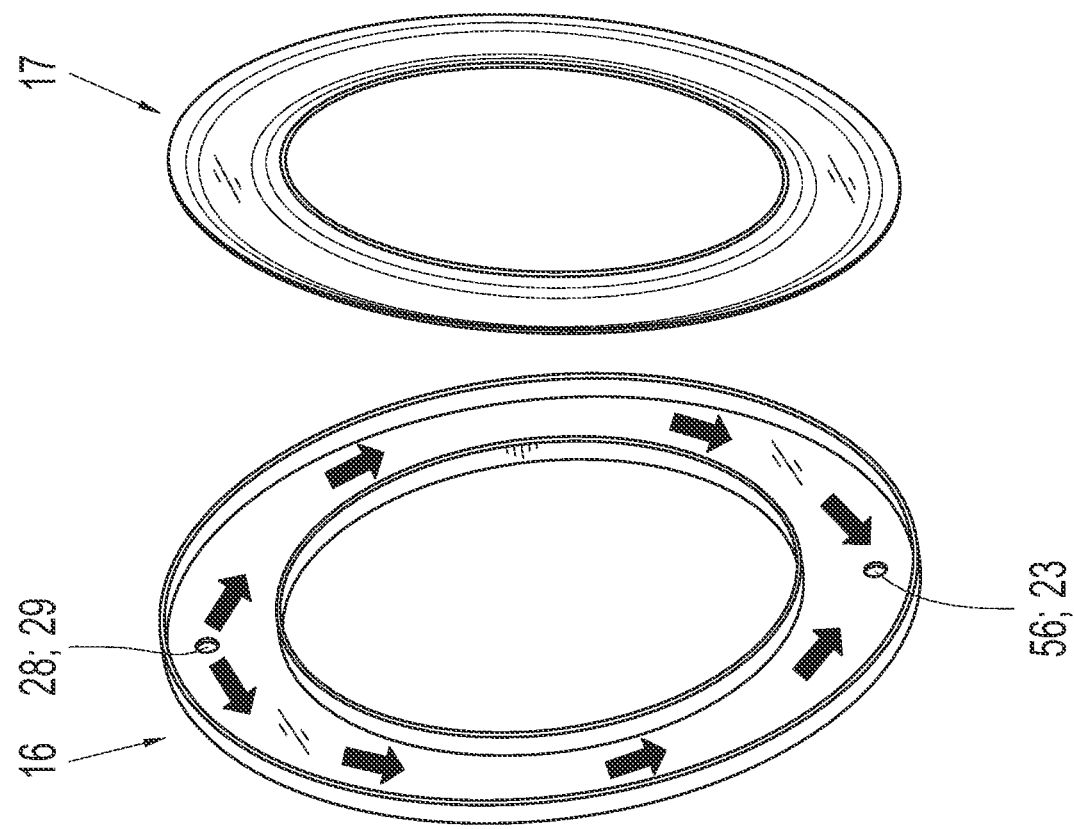

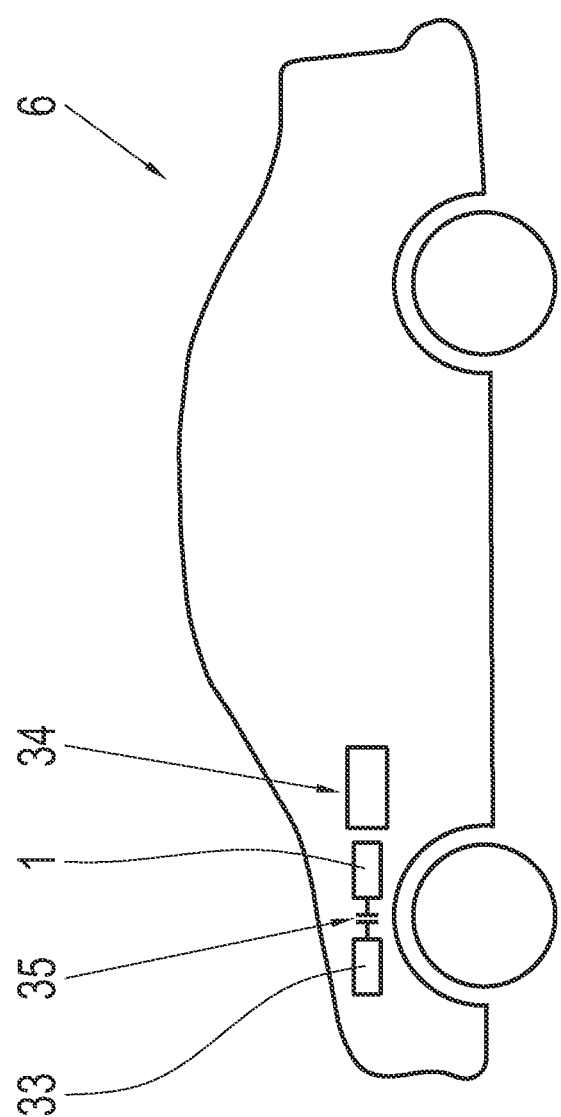

ELECTRIC MACHINE FOR DRIVING A MOTOR VEHICLE

CROSS-REFERENCE TO RELATED APPLICATION

The present application is related and has right of priority to German Patent Application No. 102020216230.1 filed in the German Patent Office on Dec. 18, 2020, which is incorporated by reference in its entirety for all purposes.

FIELD OF THE INVENTION

The invention relates generally to an electric machine for driving a motor vehicle.

BACKGROUND

An electric machine that drives a motor vehicle is operated at high power levels. This also means, however, that a large amount of heat arises, which must be dissipated as waste heat from the electric machine as much as possible, in order, for example, not to damage bearings or a rotor shaft of the electric machine. The heat arising due to the high power levels can also have a power-limiting effect. The temperature in the winding overhangs is very critical. Once a certain winding overhang temperature has been reached, a control unit of the electric machine typically reduces power, which is also known as "derating".

SUMMARY OF THE INVENTION

Example aspects of the present invention can assist with better dissipating waste heat, in particular, from winding overhangs of an electric machine of a motor vehicle.

Example aspects of the present invention provide a cooling concept for an electric machine of a motor vehicle. The electric machine can be utilized, in particular, for driving the motor vehicle, either alone or in combination with an internal combustion engine. In particular, according to example aspects of the present invention, a winding overhang cooling of the electric machine is provided, wherein heat, in particular from the winding overhangs of the electric machine, is dissipated by a combined air and water cooling. In this way, a highly effective cooling, in particular of the winding overhangs, is made possible.

In this sense, according to a first example aspect of the invention, an electric machine is provided for driving a motor vehicle. The electric machine includes a stator having at least one winding overhang. Cooling fluid (in particular cooling water, for example, a mixture of water and antifreeze, such as Glysantin®, which flows in the area of the at least one winding overhang, absorbs heat from the at least one winding overhang. In addition, air that flows in the area of the at least one winding overhang absorbs heat from the cooling fluid. It is therefore made possible that the cooling fluid cools the winding overhang and that the air (re-)cools the cooling fluid. In particular, in this context, the cooling fluid flows past the winding overhang at a closer distance than the distance at which the air flows past the winding overhang. For example, it can be provided that the cooling fluid flows in a fluid duct, which is adjacent to the winding overhang, whereas the air flows in an air duct, which is adjacent to the fluid duct.

In this way, in one example embodiment, the electric machine includes a first fluid duct and a second fluid duct. Cooling fluid that flows in the first fluid duct absorbs heat from the first winding overhang, wherein the first fluid duct is arranged, in an axial direction of the electric machine, adjacent to an end surface of the first winding overhang. According to this example embodiment, on the other axial side of the electric machine, cooling fluid that flows in the second fluid duct absorbs heat from the second winding overhang, wherein the second fluid duct is arranged, in the axial direction of the electric machine, adjacent to an end surface of the second winding overhang.

The electric machine can also include a first air duct and a second air duct. The first air duct is arranged separated from the first fluid duct and adjacent to the first fluid duct. "Separated" is intended to mean that no air that flows in the first air duct can mix with fluid that flows in the first fluid duct. Air flowing in the first air duct absorbs heat from the cooling fluid flowing in the first fluid duct. On the other axial side of the electric machine, in a similar way, the second air duct is arranged separated from the second fluid duct and adjacent to the second fluid duct. Air flowing in the second air duct absorbs heat from the cooling fluid flowing in the second fluid duct.

The combined air and water cooling can be made possible, in particular, in that a housing and, optionally, also a housing cover of the electric machine is/are designed in such a way that the above-described cooling of the winding overhangs can be installed. In this sense, the electric machine according to one further example embodiment includes a housing. The housing has an end-surface housing part, which at least partially closes the electric machine on a first axial end surface of the electric machine. According to this example embodiment, the first air duct is at least partially formed by the end-surface housing part. For example, the end-surface housing part can form the first air duct in such a way that end-surface housing part retains one open side, which can be closed, for example, by a further component, for example, by a further component that forms the first fluid duct.

In addition, the electric machine can have a housing cover on the other axial end surface. This housing cover can be distinguished, in particular, by the fact that the housing cover at least partially closes the electric machine on the second axial end surface, and that the housing cover simultaneously forms at least a portion of the second air duct. Similarly to that described above in conjunction with the housing, the cover can also form the second air duct in such a way that the cover retains, for example, one open side, which can be closed, in particular, by a further component, for example, by a further component that forms the second fluid duct.

The cooling of the electric machine is particularly effective and efficient when an air cooling is enabled, according to which air circulates within the electric machine and, on the one hand, absorbs heat from components to be cooled, for example, from the winding overhangs or from a rotor shaft and, on the other hand, can give off the heat again, in particular to external surroundings of the electric machine. In this sense, the electric machine according to one further example embodiment includes a closed air circuit and a fan, which is arranged within the closed air circuit. This closed air circuit includes the two air ducts described in greater detail further above, i.e., the first air duct and the second air duct form a section of the closed air circuit. The fan conveys air within the closed air circuit, i.e., the fan induces the circulation of air that is located within the closed air circuit.

It is particularly advantageous for the cooling of the electric machine when the air circulating within the closed air circuit can absorb heat from a rotor shaft of the electric machine. For this purpose, the electric machine can include a rotor having a rotor shaft and the air circuit can include a rotor air duct. The rotor air duct can extend, for example, in the axial direction of the electric machine, along the rotor shaft or through the rotor shaft. For this purpose, the rotor shaft can be formed in such a way that the rotor shaft forms at least one portion of the rotor air duct. For example, the rotor shaft can have a star-shaped or cross-shaped cross-section for this purpose, allowing open spaces to be formed, via which the air can flow through the rotor shaft. The rotor air duct can be connected, at the two axial ends of the rotor shaft, to the first air duct on the one hand and to the second air duct on the other hand, wherein air flows out of the second air duct into the rotor air duct, and wherein air flows out of the rotor air duct and into the first air duct. Air flowing in the rotor air duct absorbs heat from the rotor shaft.

Air that has absorbed the heat from the winding overhangs and from the rotor shaft can, according to one further example embodiment, give off at least a portion of this heat externally in the proximity of an, in particular, water-cooled stator cooling bush, and so the air is re-cooled and, thereafter, can absorb heat again, in order to continue to cool the elements of the electric machine (closed air circuit). In this sense, the electric machine according to one further example embodiment includes a stator cooling bush and the air circuit includes a stator air duct. The stator cooling bush surrounds the stator in a radial direction of the electric machine, wherein the housing surrounds the stator cooling bush in the radial direction of the electric machine. The stator air duct can extend, in the axial direction of the electric machine, along an outer circumference of the stator cooling bush. The stator air duct is connected, at the two ends of the stator air duct, to the first air duct, on the one hand, and to the second air duct, on the other hand, wherein air flows out of the first air duct into the stator air duct, and wherein air flows out of the stator air duct into the second air duct. The housing absorbs heat from the air that flows in the stator air duct and gives off at least a portion of the absorbed heat to external surroundings of the electric machine.

Provided that the stator cooling bush guides a fluid, in particular cooling water, which is to cool the stator, in particular the stator core and, if necessary, also the winding overhangs of the stator, this fluid can also be utilized for cooling the air that has previously absorbed heat from the two winding overhangs of the stator and from the rotor shaft. In this way, the heated air can be cooled via the housing and the surroundings as well as via the cooling water of the stator cooling bush. For this purpose, the stator cooling bush can form a stator fluid duct separated from the stator air duct, wherein a fluid flows through the stator fluid duct and, in so doing, absorbs heat from the stator. The stator air duct can be arranged between the stator cooling bush and the housing, wherein the fluid that flows through the stator fluid duct absorbs heat from the air that flows through the stator air duct. The stator fluid duct can belong to the cooling water circuit of the electric machine. This example embodiment makes it possible to dissipate a particularly large amount of heat from the stator. In addition, the same cooler can be utilized for re-cooling cooling fluid and the same pump can be utilized for conveying cooling fluid, in order to supply the first fluid duct and the second fluid duct as well as the stator fluid duct with cooled cooling fluid. As a result, components, assembly and maintenance effort, and costs can be saved.

In this sense, the stator in one further example embodiment includes a stator core, wherein the stator cooling bush forms a stator fluid duct, which is arranged between the stator core and the stator cooling bush. A fluid flows through the stator fluid duct and, in so doing, absorbs heat from the stator core, wherein the stator air duct is arranged separated from the fluid duct between the stator cooling bush and the housing. The cooling fluid that flows through the fluid duct absorbs heat from the air that flows through the stator air duct.

The fluid ducts can be clamped (centering and fixation) between housing parts (for example, the above-described housing and housing cover of the electric machine) and the relevant winding overhang. In particular, it is provided according to one further example embodiment that the fluid ducts are each designed as two pieces. The fluid ducts each include a flexible element, which operates, in particular, as a diaphragm. The flexible element can conform very well to the contour of the winding overhang. In addition, the fluid ducts each include a rigid element (for example, a sheet-metal pressed part), which is positioned, for example, in the housing parts (cover or housing of the electric machine). By placing the diaphragm against the winding overhangs, a particularly large contact surface forms due to deformation. This enables very good heat conduction.

In this sense, the first fluid duct according to one further example embodiment includes a rigid element and a flexible element. The rigid element and the flexible element jointly delimit the first fluid duct, wherein the flexible element rests against an outer contour of the axial end surface of the first winding overhang. The flexible element is configured for adapting to the outer contour of the axial end surface of the first winding overhang. Alternatively or additionally, the second fluid duct according to this example embodiment also includes a rigid element and a flexible element, wherein the rigid element and the flexible element jointly delimit the second fluid duct. The flexible element rests against an outer contour of the axial end surface of the second winding overhang and is configured for adapting to the outer contour of the axial end surface of the second winding overhang.

"Fluid-tight" can be understood to mean that the cooling fluid that is located in the cooling duct does not enter an interior space of the electric machine via the rigid element and the flexible element when the cooling duct assembly is arranged in the electric machine. As a result, the interior space of the electric machine can be kept dry, i.e., free of cooling fluid. As a result, for example, churning losses resulting from the rotating rotor can be avoided. The cooling fluid can be, for example, water, for example, mixed with an additive, such as Glysantin®.

In the sense of a cooling water circuit, the cooling fluid can be routed to the cooling duct through an inlet, guided through the cooling duct for heat dissipation in parallel (separated only by the flexible element) along the axial end surface of the winding overhang, thereafter discharged via an outlet, re-cooled outside the cooling duct (for example, by a cooler or a heat exchanger) and, thereafter, routed back to the cooling duct through the inlet.

In one example embodiment, the rigid element is annular and has a U-shaped cross-section, and so the rigid element forms an annular cooling duct, which is closed on a first axial end surface and is open on a second axial end surface, which faces away from the first end surface. The flexible element in this example embodiment also has an annular shape, and so the flexible element is configured for closing the annular cooling duct on the second axial end surface. The rigid element and the flexible element are connected to each other in a fluid-tight manner, and so they jointly form the fluid-tight cooling duct. This example embodiment requires only two annular sealing points between the rigid element and the flexible element.

In one further example embodiment, the rigid element and the flexible element are connected to each other via vulcanization, an adhesive bond, a welded joint, or a clamping connection. The flexible element is attached, in particular, at a radially inner and at a radially outer leg of the rigid element, which has a U-shaped cross-section. The interface between the flexible element and the relevant leg of the rigid element must be fluid-tight. This can take place particularly well via clamping points, adhesive bonding, vulcanization, or welding.

The flexible element is preferably made of a heat-conducting material, and so cooling fluid located within the cooling duct assembly can absorb heat, via the flexible element, from the winding overhang to be cooled, and so the winding overhang is cooled. For example, the flexible element can be made of rubber, for example, FKM (fluorinated rubber). There is a wide selection of suitable plastic compositions for this purpose. The temperature resistance and ageing resistance of the material are important.

The flexible element can also be made of a composite material. A composite material is a material made up of two or more combined materials, wherein this material has material properties other than those of the individual materials combined with one another. Composite materials are advantageous, since, due to the use of two or more materials, the composite materials can combine the favorable properties of various materials.

The rigid element can be a cost-effectively manufacturable sheet-metal pressed part.

The rigid element of the first fluid duct can have been placed (centering and fixation) into a recess of the housing part of the electric machine matching the outer contour of the rigid element, wherein the flexible element of the first fluid duct rests against the first winding overhang in such a way that the surface of the flexible element adapts to an outer contour of the first winding overhang. In addition, the rigid element of the second fluid duct can have been placed into a recess of the housing cover of the electric machine matching the outer contour of the rigid element, wherein the flexible element of the second fluid duct rests against the second winding overhang in such a way that the surface of the flexible element adapts to an outer contour of the second winding overhang.

The electric machine can be operated as a motor or as a generator. When the electric machine is operated as a motor, an, in particular, time-varying voltage can be applied to the stator and to the windings located therein, in order to generate a time-varying magnetic field, which acts in the rotor to induce a torque and, thereby, generate a turning motion. When the electrical machine is operated as a generator, for example, electrical energy can be generated by inducing a changing magnetic field (for example, by rotating the rotor) in a looped or coiled conductor of the stator, in order to induce a current in the conductor.

In one example embodiment, the rigid element of the first fluid duct has an input-side port for the inflow of cooling fluid into the first fluid duct. In addition, the rigid element of the first fluid duct has an output-side port for the outflow of cooling fluid out of the first fluid duct. The input-side port is connected in a fluid-tight manner to a first port of a cooling water circuit of the electric machine, and the output-side port is connected in a fluid-tight manner to a second port of the cooling water circuit of the electric machine.

In a similar way, the rigid element of the second fluid duct can have an input-side port for the inflow of cooling fluid into the second fluid duct, wherein the rigid element of the second fluid duct also has an output-side port for the outflow of cooling fluid out of the second fluid duct. The input-side port is connected in a fluid-tight manner to a first port of the cooling water circuit of the electric machine, and the output-side port is connected in a fluid-tight manner to a second port of the cooling water circuit of the electric machine.

Advantageously, the first fluid duct and the second fluid duct are both connected to the same cooling water circuit of the electric machine. The aforementioned ports of the cooling water circuit can be, for example, hydraulic plugs, for example, made of metal. The cooling water circuit of the electric machine includes, in particular, a hydraulic pump for circulating the cooling fluid within the cooling water circuit and a heat exchanger for re-cooling cooling fluid that has previously absorbed heat from components of the electric machine to be cooled.

The input-side port and the first port of the cooling water circuit of the electric machine can be connected to each other via vulcanization, an adhesive bond, a welded joint, a screw connection, or a clamping connection. Alternatively or additionally, the output-side port and the second port of the cooling water circuit of the electric machine can be connected to each other via vulcanization, an adhesive bond, a welded joint, a screw connection, or a clamping connection. The connection between the relevant ports can also be advantageously implemented by way of a surface seal or a sealing ring between the input-side/output-side port of the cooling water duct and the first/second hydraulic port of the cooling water circuit.

According to a second example aspect of the invention, a motor vehicle is provided, which includes an electric machine according to the first example aspect of the invention. The motor vehicle can include an electric axle drive, which is driven by the electric machine. The electric machine is arranged in the motor vehicle in such a way that the motor vehicle can be driven by the electric machine when the electric machine is operated as a motor. In addition, the electric machine can be arranged within the motor vehicle in such a way that the electric machine is driven by the motor vehicle when the electric machine is operated as a generator. The vehicle is, for example, a commercial vehicle, an automobile (for example, a passenger car having a weight of less than three and a half tons (3.5 t)), a motorcycle, a motor scooter, a moped, a bicycle, an e-bike, a bus, or a truck (bus and truck, for example, having a weight of more than three and a half tons (3.5 t)), or also a rail vehicle, a ship, or an aircraft, such as a helicopter or an airplane. In other words, the invention is usable in all areas of transportation, such as automotive, aviation, nautical science, astronautics, etc. The motor vehicle can belong, for example, to a vehicle fleet. The motor vehicle can be controlled by a driver, possibly assisted by a driver assistance system. The motor vehicle can also be, for example, remotely controlled and/or (semi-)autonomously controlled, however.

BRIEF DESCRIPTION OF THE DRAWINGS

Exemplary embodiments of the invention are explained in greater detail in the following with reference to the diagrammatic drawings, wherein identical or similar elements are labeled with the same reference numbers, wherein FIG. 6 shows a perspective view of the rigid element and of the flexible element according to FIG. 5, FIG. 7 shows a side view of a motor vehicle, which can be driven by the electric machine according to FIG. 1.

DETAILED DESCRIPTION

Figure 1:
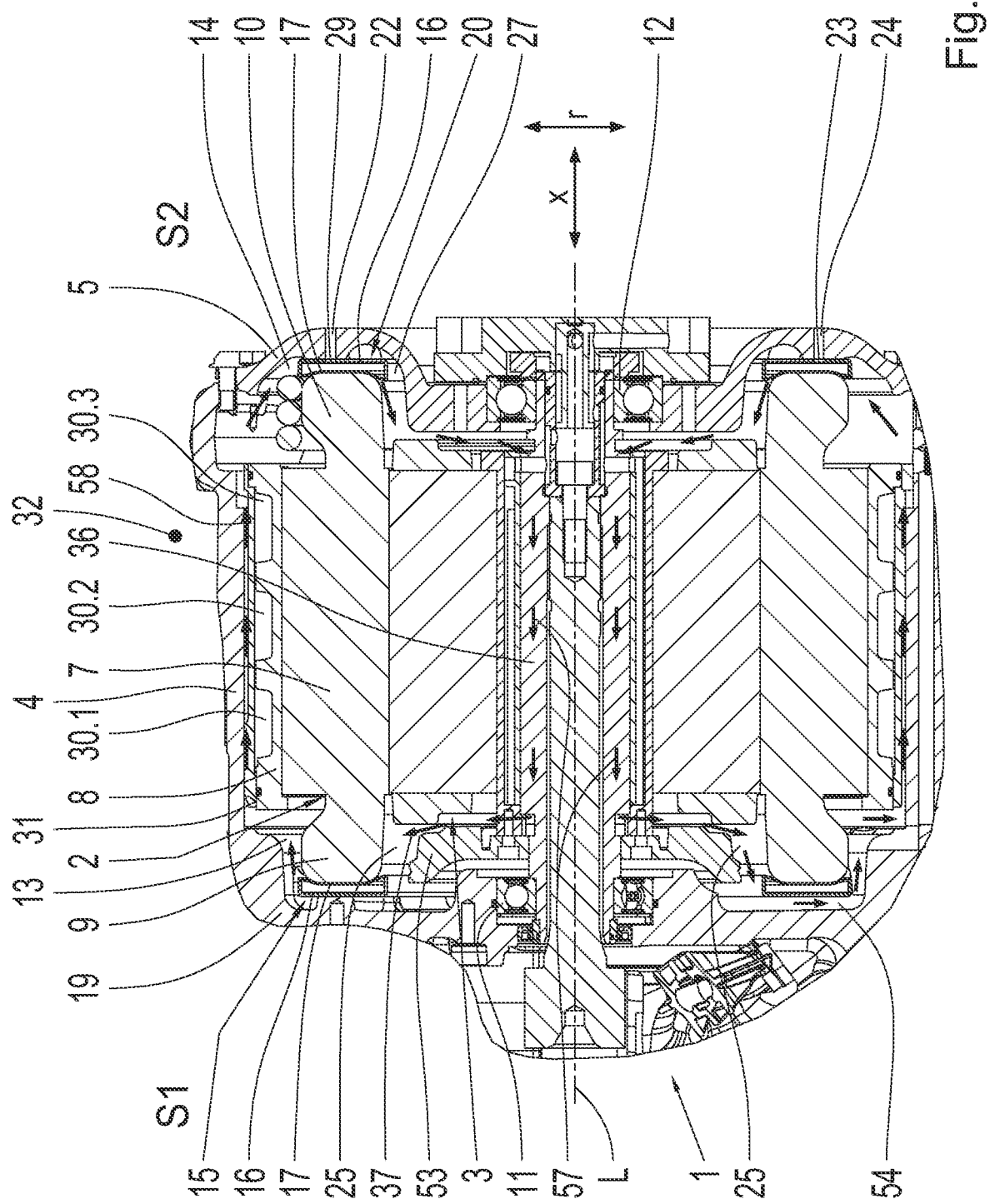
FIG. 1 shows a longitudinal sectional representation of one exemplary embodiment of an electric machine according to the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 8:
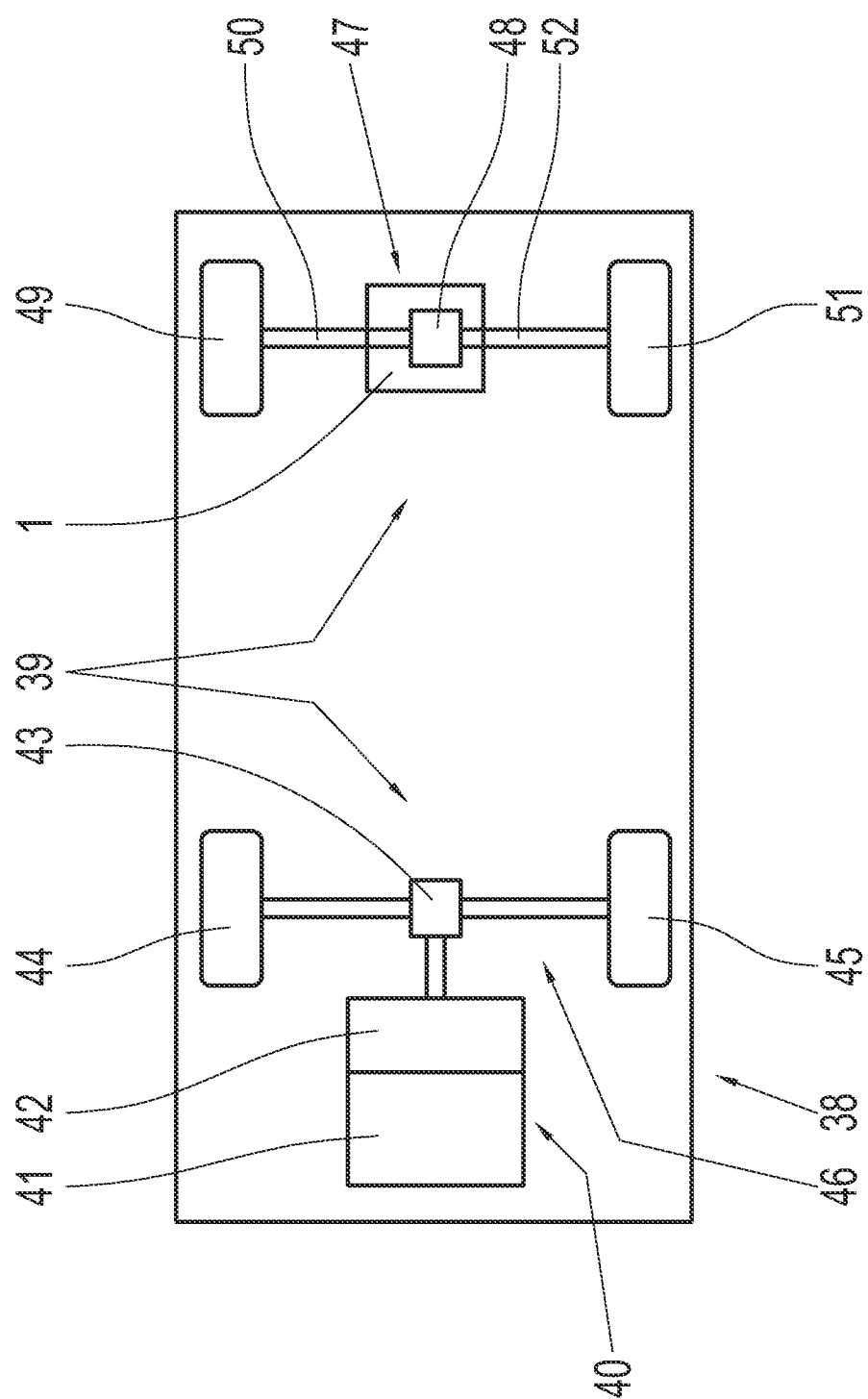
FIG. 8 shows a top view of a drive train of a motor vehicle, which can be driven by the electric machine according to FIG. 1.

FIG. 1 shows an electric machine 1 having a stator 2 and having a rotor 3. The electric machine 1 also includes a housing 4 and a housing cover 5. The electric machine 1 can be operated as a motor and as a generator. The electric machine 1 can drive a motor vehicle 6 or 38, which is shown in FIG. 7 and FIG. 8, respectively.

When the electric machine 1 is operated as a motor, a time-varying voltage can be applied to the stator 2 and to the windings located therein, in order to generate a time-varying magnetic field, which acts in the rotor 3 to induce a torque and, thereby, generate a turning motion. When the electric machine 1 is operated as a generator, electrical energy can be generated by inducing a changing magnetic field (for example, by rotating the rotor 3) in a looped or coiled conductor of the stator 2, in order to induce a current in the conductor.

The stator 2 includes a stator core 7, a stator cooling bush 8, and a first winding overhang 9 on a first end surface S1 of the electric machine 1 and a second winding overhang 10 on a second end surface S2 of the electric machine 1. The stator core 7 and the stator cooling bush 8 are fixedly (i.e., the stator core 7 and the stator cooling bush system 8 do not rotate) accommodated in the housing 4. The stator core 7 has a cylindrical inner cavity, in which the rotor 3 is arranged. The rotor 3 is mounted in a first antifriction bearing 11 and in a second antifriction bearing 12 so as to be rotatable about a longitudinal axis L of the electric machine 1. The longitudinal axis L extends in the axial direction x of the electric machine 1.

The first winding overhang 9 is arranged within a first winding overhang space 13, which is represented on the left in FIG. 1 (first end surface S1). The second winding overhang 10 is arranged within a second winding overhang space 14, which is represented on the right in FIG. 1 (second end surface S2).

The first winding overhang space 13 is a hollow space. In an axial direction x of the electric machine 1, the first winding overhang space 13 is delimited by a housing part 19 of the housing 4, wherein the housing part 19 closes the electric machine 1 on the first end surface S1. The first winding overhang space 13 is also delimited externally, in a radial direction r of the electric machine 1, by the housing 4. Internally, in the radial direction r, the winding overhang space 13 transitions into a first rotor space 25. The first winding overhang space 13 and the first rotor space 25 are dry, i.e., no cooling fluid is located within the first winding overhang space 13 and within the first rotor space 25.

The second winding overhang space 14 is also a hollow space. In the axial direction x of the electric machine 1, the second winding overhang space 14 is delimited by the housing cover 5, which closes the electric machine 1 toward the outside on the second end surface S2. The second winding overhang space 14 is also delimited externally, in a radial direction r of the electric machine 1, by the housing 4. Internally, in the radial direction r, the second winding overhang space 14 transitions into a second rotor space 27. The second winding overhang space 14 and the second rotor space 27 are dry, i.e., no cooling fluid is located within the second winding overhang space 14 and within the second rotor space 27.

An annular first fluid duct 15 is arranged within the first winding overhang space 13 and includes a rigid element 16, for example, a sheet-metal pressed part, and a flexible element 17, for example, made of rubber. The rigid element 16 is annular and has a U-shaped cross-section. A longer inner leg of the rigid element 16 delimits the annular first cooling duct 15 in the axial direction x on the second end surface S2 of the electric machine 1. Two smaller legs delimit the first fluid duct 15 internally and externally, respectively, in the radial direction r.

The rigid element 16 therefore forms the first fluid duct 15 in such a way that the first fluid duct 15 is closed, in the axial direction x, on the first end surface S1. In the direction of the second end surface S2, however, the first fluid duct 15 formed by the rigid element 16 is open (FIG. 6) and is closed by the flexible element 17 (FIG. 6). For this purpose, the flexible element 17 is also annular and is formed to be complementary to the rigid element 16. End sections of the flexible element 17, which face away from one another, are each connected to one of the legs of the rigid element 16 in such a way that the first fluid duct 15 formed by the rigid element 16 and the flexible element 17 is closed and fluid-tight. The connection between the end sections and the legs can take place via clamping points, adhesive bonds, vulcanization, welding, or other suitable joining methods that enable a fluid-tight connection between the rigid element 16 and the flexible element 17.

Figure 3:
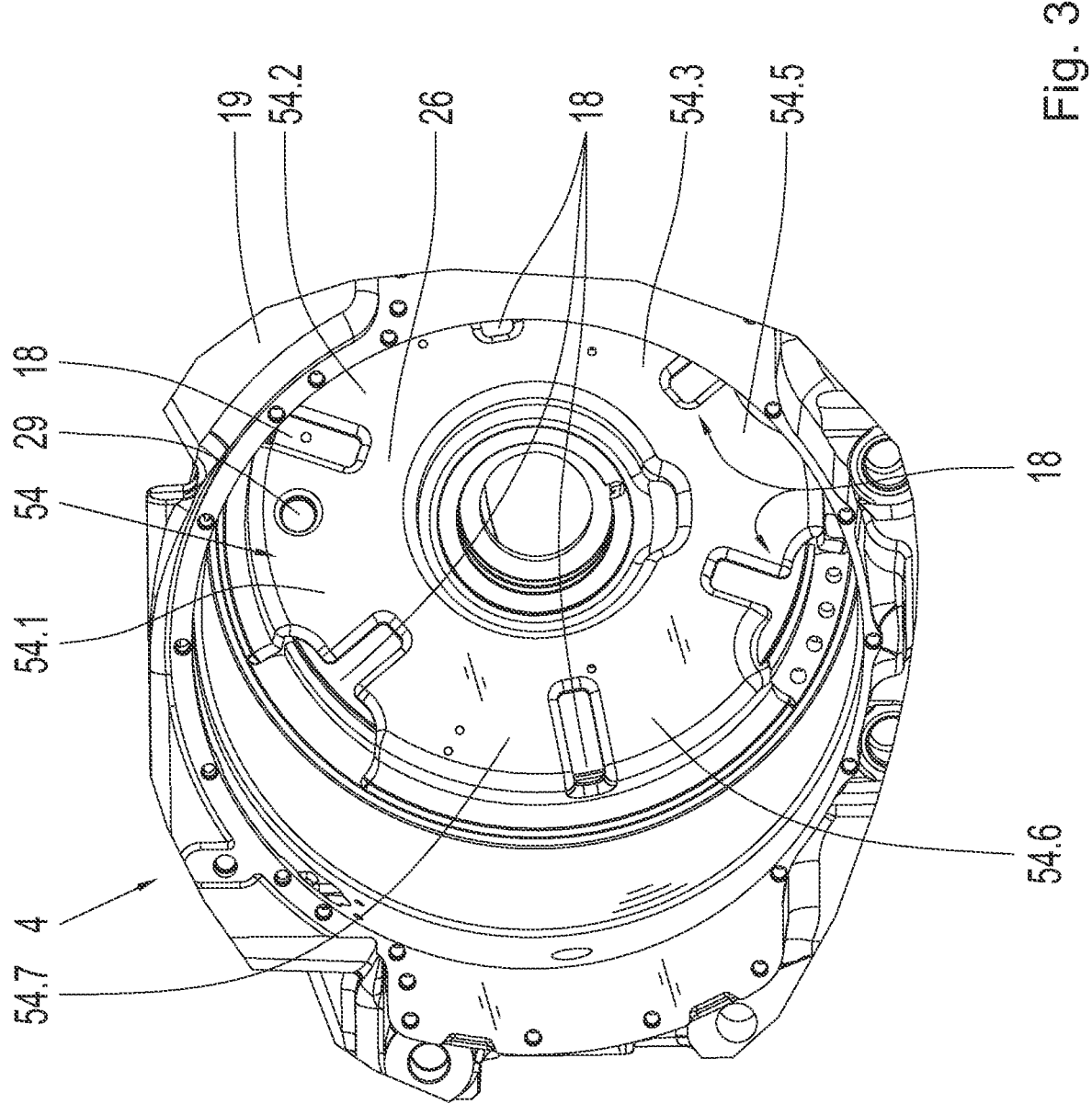
FIG. 3 shows a portion of a housing of the electric machine according to FIG. 1 in a perspective representation, with a viewing direction toward the interior space, which is provided for the installation of the electric machine.

The rigid element 16 is inserted, in the direction of the first end surface S1, into a recess 26 (cf. FIG. 3) of the inner surface of the housing 4 or the housing part 19 matching the outer contour of the rigid element 16. The housing 4 has a centering and fixing diameter 18 there, which is stepped in the axial direction (FIG. 3). The flexible element 17 rests against the outer surface of the first winding overhang 9 oriented in the direction of the first end surface S1. Due to its flexibility, the flexible element 17 can conform very well to the contour of the first winding overhang 9 in the manner of a diaphragm. Due to the flexible element 17 resting against the first winding overhang 9 in the manner of a diaphragm, very good heat conduction is possible (large contact surface due to deformation).

The rigid element 16 includes an input-side port 28 (FIGS. 2, 6), via which a flow of cooled cooling fluid can be routed to the first fluid duct 15. This flow of cooled cooling fluid is indicated in FIG. 6 by thick flow arrows within the rigid element 16. In the exemplary embodiment shown, the input-side port 28 is arranged at the inner leg and includes a bore in the inner leg as well as a hollow cylindrical connection piece. The input-side port 28 is connected in a fluid-tight manner (FIG. 2) to a line element 29 of a cooling water circuit of the electric machine 1 extending through the housing part 19, for example, via clamping, adhesive bonds, vulcanization, welding, or other suitable joining methods that enable a fluid-tight connection between the input-side port 28 and the line element 29 of the cooling water circuit of the electric machine 1.

The rigid element 16 also includes an output-side port 56, via which a flow of cooling fluid, which has previously absorbed heat from the first winding overhang 9, can be discharged from the first fluid duct 15. The output-side port 56 can also be arranged at the inner leg of the rigid element 16 and include a bore in the inner leg as well as a hollow cylindrical connection piece. The output-side port can be connected in a fluid-tight manner to a line element of the cooling water circuit of the electric machine 1 extending through the housing part 19, for example, via clamping, adhesive bonds, vulcanization, welding, or other suitable joining methods that enable a fluid-tight connection between the output-side port and the line element of the cooling water circuit of the electric machine 1.

In the exemplary embodiment shown, a second fluid duct 20 is arranged within the second winding overhang space 14 with mirror symmetry with respect to the first fluid duct 15. The second fluid duct 20, having one further rigid element 16 and one further flexible element 17 in the exemplary embodiment shown, has the same configuration, in principle, as the first fluid duct 15. The second fluid duct 20 and/or the further rigid element 16 and further flexible element 17 are arranged mirror symmetrically with respect to the first fluid duct 15 and are connected to the cooling water circuit.

The further rigid element 16 includes an input-side port 29, via which a flow of cooled cooling fluid can be routed to the second fluid duct 20. In the exemplary embodiment shown, the input-side port 29 is arranged at the inner leg of the further rigid element 16 and includes a bore in the inner leg. The housing cover 5 includes a bore 22 (inlet hole) extending in the axial direction, which is connected to the cooling water circuit of the electric machine 1 and/or is a part of this cooling water circuit. The bore 22 in the housing cover 5 is connected to the bore in the inner leg of the further rigid element 16, and so cooled cooling fluid from the cooling water circuit of the electric machine 1 can be guided into the second fluid duct 20 in order to cool the second winding overhang 10. The further rigid element 16 also includes an output-side port 23, via which a flow of cooling fluid, which has previously absorbed heat from the second winding overhang 10, can be discharged from the second fluid duct 20. The output-side port 23 is connected to an outflow hole 24 within the housing cover 5. The outflow hole 24 is connected to the cooling water circuit of the electric machine 1 and/or is a part of this cooling water circuit.

Figure 2:
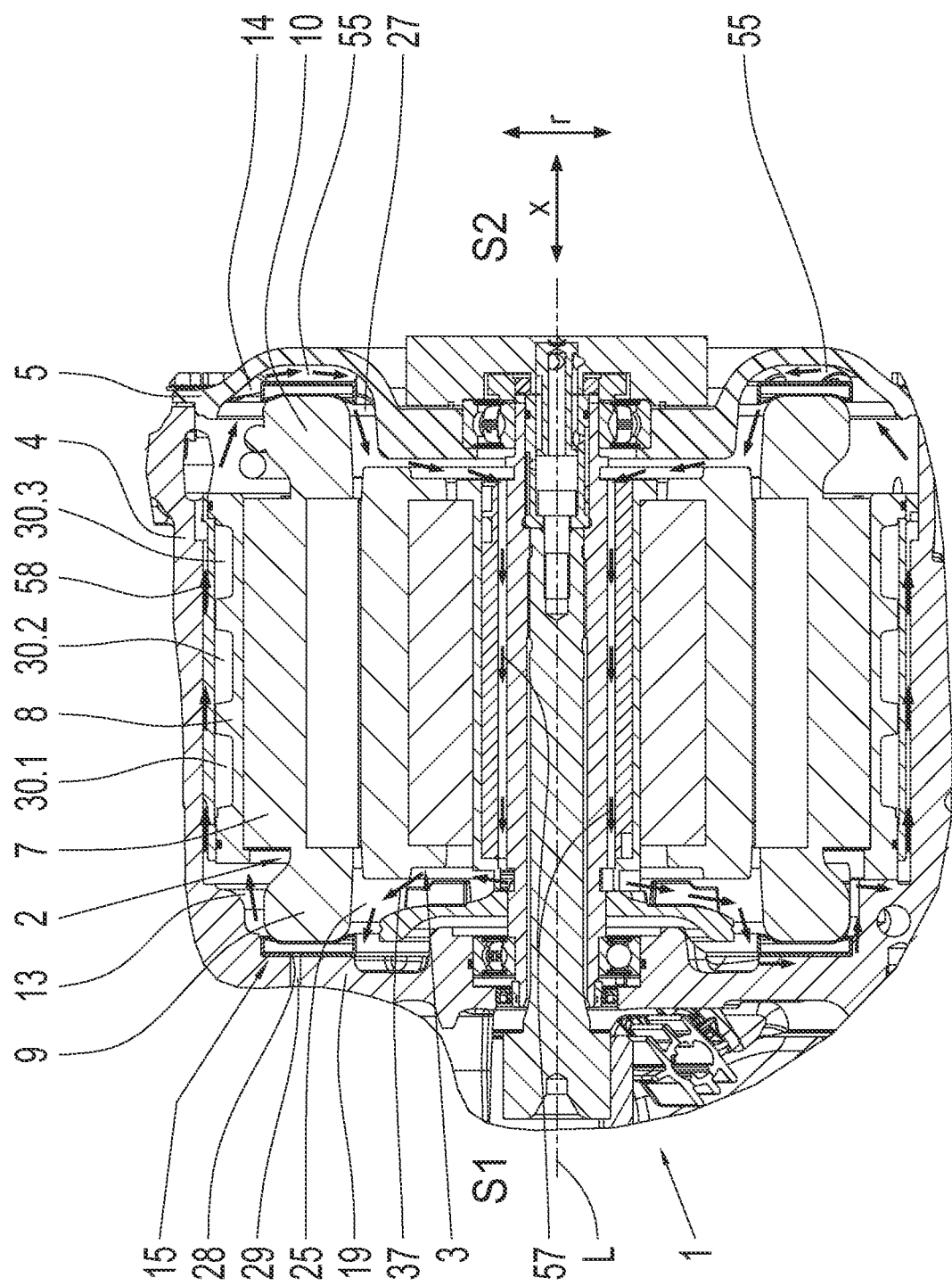
FIG. 2 shows the electric machine according to FIG. 1 in an alternative sectioning.

FIGS. 1 and 2 show that the stator cooling bush 8 externally surrounds the stator 2 and the stator core 7 in the radial direction r. The housing 4 surrounds the stator cooling bush 8 in the radial direction r of the electric machine 1. The stator cooling bush 8 has recesses 30.1, 30.2, 30.3. The recesses 30.1, 30.2, 30.3 can extend, for example, partially or completely (i.e., 360°), in a circumferential direction around the stator cooling bush 8. The recesses 30.1, 30.2, 30.3 can jointly form a stator fluid duct, which extends, for example, in a helical manner. Alternatively, the recesses 30.1, 30.2, 30.3 can also form, for example, multiple individual stator fluid ducts extending in parallel to one another and arranged at a distance from one another in the axial direction x. The recesses 30.1, 30.2, 30.3 extend between the stator cooling bush 8 and the housing 4 of the electric machine 1, and so cooling fluid delivered through the recesses 30.1, 30.2, 30.3 can cool the stator core 7. Cooling fluid that flows through the recesses 30.1, 30.2, 30.3 can absorb heat from the stator core 7 and give off the heat, via the housing 4, to external surroundings 32 of the electric machine 1, in particular to air in the external surroundings 32 of the electric machine 1. Alternatively or additionally, the cooling fluid can be re-cooled by a heat exchanger (not shown) of the cooling water circuit. The cooling fluid can be conveyed by a pump (not shown) of the cooling water circuit. The recesses 30.1, 30.2, 30.3 can belong to the same cooling water circuit as the fluid ducts 15, 20, which are formed by the rigid elements 16 and the flexible elements 17.

Figure 5:
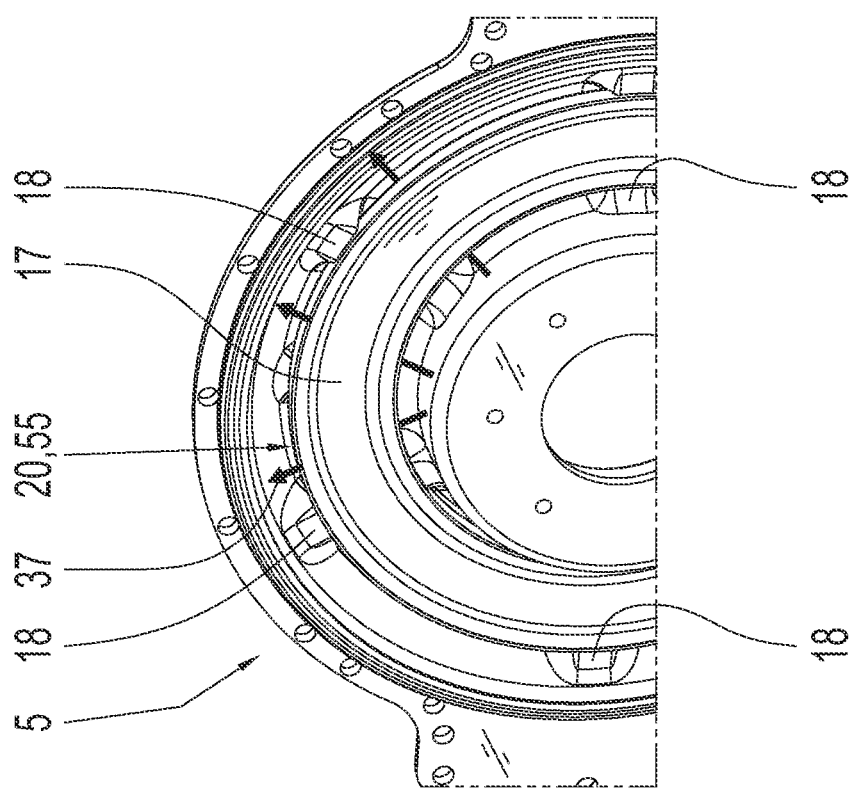
FIG. 5 shows a perspective representation of the housing cover according to FIG. 4, wherein a fluid duct, which is formed from a flexible element and from a rigid element, has been placed into the housing cover.

In addition to the aforementioned cooling of the electric machine 1 by way of the cooling fluid, a rotor shaft 36 of the rotor 3 as well as the two winding overhangs 9, 10 are cooled by an air circulation that circulates within the electric machine 1 in a closed manner. The course of the air circulation is illustrated in FIGS. 1, 2, and 5 by a series of flow arrows 37. A fan 53 is arranged within the air circuit 37 and conveys air located therein, and so the air circulates within the air circuit 37. The fan 53, in particular the fan wheel of the fan 53, is rotatably mounted on the rotor shaft 36 adjacent to the first rotor bearing 11 in the exemplary embodiment shown.

The air circuit 37 has a first air duct 54 (FIG. 1) and a second air duct 55 (FIG. 2). The first air duct 54 and the second air duct 55 extend, in the exemplary embodiment shown, from the inside toward the outside in the radial direction r of the electric machine 1. The first air duct 54 and the second air duct 55 each include multiple air duct sections, which are arranged next to one another in a star-shaped manner. The end-surface housing part 19 and a surface of the longer inner leg of the rigid element 16 facing away from the first fluid duct 15 jointly delimit the first air duct 54, and so the first air duct 54 is arranged separated from the first fluid duct 15 and adjacent to the first fluid duct 15 in the axial direction x of the electric machine 1. In the exemplary embodiment shown, the individual air duct sections of the first air duct 54 are separated from one another by the centering and fixing elements 18. For example, the end-surface housing part 19 forms, in the area of the first air duct 54, a total of six centering and fixing elements 18, which, between each other, delimit and separate a total of seven air duct sections of 54.1 through 54.7 (FIG. 3). Fluid that flows through the first fluid duct 15 absorbs heat from the first winding overhang 9. Air that flows through the first air duct 54 and/or through the air duct sections 54.1 through 54.7 absorbs heat from the fluid that flows through the first fluid duct 15 and has absorbed the heat from the first winding overhang 9. In this way, the first winding overhang 9 is cooled by fluid and air.

Figure 4:
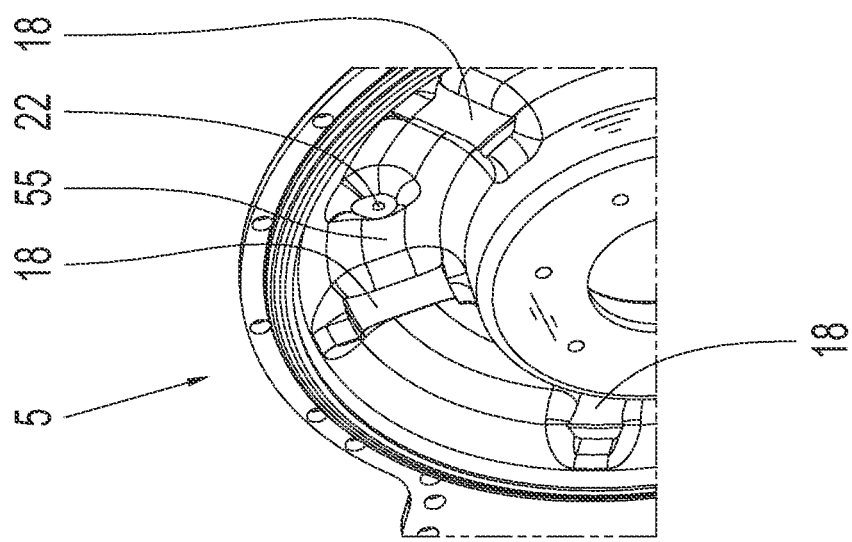
FIG. 4 shows a portion of a housing cover of the electric machine according to FIG. 1 in a perspective representation, with a viewing direction toward the interior space, which is provided for the installation of the electric machine.

The housing cover 5 and a surface of the longer inner leg of the further rigid element 16 of the second fluid duct 20 facing away from the second fluid duct 20 jointly delimit the second air duct 55, and so the second air duct 55 is arranged separated from the second fluid duct 20 and adjacent to the second fluid duct 20. In the exemplary embodiment shown, the air duct sections of the second air duct 20 are separated from one another by the centering and fixing elements 18 (cf. FIGS. 4, 5). Fluid that flows through the second fluid duct 20 absorbs heat from the second winding overhang 10. Air that flows through the second air duct 55 and/or through the air duct sections of the second duct 55 absorbs heat from the fluid that flows through the second fluid duct 20 and has absorbed the heat from the second winding overhang 10. In this way, the second winding overhang 10 is cooled by fluid and air.

The air circuit 37 includes a rotor air duct 57 for cooling the rotor shaft 36. The rotor air duct 57 extends through the rotor shaft 36 in the axial direction x of the electric machine 1. The rotor shaft 36 forms the rotor air duct 57, for example, in that the rotor shaft 36 has a star-shaped cross-section. On the second end surface S2, the second air duct 55 opens into the second rotor space 27, which opens into the rotor air duct 57 (FIG. 2). In this way, the rotor air duct 57 is connected to the second air duct 55 via the second rotor space 27. Therefore, air can flow out of the second air duct 55 into the rotor air duct 57 via the second rotor space 27. On the first end surface S1, the rotor air duct 57 opens into the first rotor space 25, which opens into the first air duct 54 (FIG. 1). In this way, the rotor air duct 57 is connected to the first air duct 54 via the first rotor space 25. Therefore, air can flow out of the rotor air duct 57 into the first air duct 54 via the first rotor space 25. The air flowing through the rotor air duct 57 absorbs heat from the rotor shaft 36 and, as a result, cools the rotor shaft 36.

The air circuit 37 includes a stator air duct 58 in the area of the stator cooling bush 8 in order to cool the air that has previously absorbed heat from the second winding overhang 10, from the rotor shaft 36, and from the first winding overhang 9 (in this order and/or flow direction), so that the air can subsequently absorb heat again from the aforementioned components (in the aforementioned order and/or flow direction), in order to cool these components. The stator air duct 58 extends, in the axial direction x of the electric machine 1, along the outer circumference 31 of the stator cooling bush 8 between the stator cooling bush 8 and the housing 4 of the electric machine 1. On the first end surface S1, the first air duct 54 opens into the first winding overhang space 13, which opens into the stator air duct 58. In this way, the stator air duct 58 is connected to the first air duct 54 via the first winding overhang space 13. Therefore, air can flow out of the first air duct 54 into the stator air duct 58 via the first winding overhang space 13.

In this way, air that flows out of the first air duct 54 via the first winding overhang space 13 into the stator air duct 58 can, on the one hand, give off heat to the housing 4, which can at least partially give off the absorbed heat to the external surroundings 32 of the electric machine 1. On the other hand, the air that flows through the stator air duct 58 can give off heat to the cooling fluid that flows through the stator fluid duct 30.1, 30.2, 30.3. In this way, the air that flows through the stator air duct 58 is cooled down or re-cooled in both radial directions r (namely, radially inward and radially outward). On the second end surface, the stator air duct 58 opens into the second winding overhang space 14, which opens into the second air duct 55. In this way, the stator air duct 58 is connected to the second air duct 55 via the second winding overhang space 14. Therefore, air can flow out of the stator air duct 58 into the second air duct 55 via the second winding overhang space 14. Since the air cools down while the air flows through the stator air duct 58, cool air is available once again downstream from the stator air duct 58 in order to cool, in particular, the second winding overhang 10, the rotor shaft 36, and the first winding overhang 9.

FIG. 7 shows, merely by way of example, a drive train of a motor vehicle 6 having the electric machine 1 according to FIG. 1. In the exemplary embodiment shown, this is a hybrid vehicle 6. An internal combustion engine 33 can be coupled to a transmission 34, and so a torque can be transmitted from an output shaft of the internal combustion engine 33 onto an input shaft of the transmission 34. In a similar way, the electric machine 1 can be coupled to the transmission 34, and so a torque can be transmitted from an output shaft of the electric machine 1 onto an input shaft of the transmission 34.

The transmission 34 can therefore be a hybrid transmission, wherein the internal combustion engine 33 and/or the electric machine 1 can be coupled to the transmission 34. The transmission 34 can be an automatic transmission. A drive of the motor vehicle 6 can take place either via the internal combustion engine 33, the electric motor 1 (i.e., the electric machine 1 operated as a motor), or via a combination of both prime movers 1, 33. The purely exemplary drive train including the transmission 34 is a parallel hybrid having a P2 architecture in the exemplary embodiment shown, wherein the electric machine 1 is arranged between the internal combustion engine 33 and the transmission 34. The internal combustion engine 33 can be separated from the electric machine 1 and from the transmission 34 via a separating clutch 35.

FIG. 8 shows a further motor vehicle 38, for example, a commercial vehicle or a passenger car. The motor vehicle 38 has a drive train 39 (explained in greater detail in the following), which optionally enables an engageable and disengageable all-wheel drive. The drive train 39 includes a drive unit 40. The drive unit 40 in the exemplary embodiment shown includes a prime mover 41, for example, an internal combustion engine (for example, the internal combustion engine 33 according to FIG. 7), or an electric machine 1 of the type shown in FIG. 1, and a transmission 42 (for example, the transmission 34 according to FIG. 5). The drive unit 40 in the exemplary embodiment shown permanently drives, via a front differential gear 43, two front wheels 44 and 45, which are mounted at a front axle 46 of the motor vehicle 38.

Alternatively or additionally to the described front axle drive, the drive train 39 can include an engageable and disengageable electric axle drive 47, which, in the exemplary embodiment shown, includes an electric machine 1 according to FIG. 1 and a rear differential gear 48. The electric axle drive 47 can (as shown by FIG. 8) be designed as a central axle drive and, for example, drive a first rear wheel 49 via a first sideshaft 50 as well as a second rear wheel 51 via a second sideshaft 52. Alternatively, the first sideshaft 50 can also be driven via a first electric axle drive 47 and the second sideshaft 52 can also be driven via a second electric axle drive 47, wherein neither of the electric axle drives 47 then needs to have a differential gear 48.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the

REFERENCE CHARACTERS

L longitudinal axis of the electric machine
S1, S2 first/second end surface of the electric machine
x/r axial/radial direction
1 electric machine
2 stator
3 rotor
4 housing
5 housing cover
6 motor vehicle
7 stator core
8 stator cooling bush
9 first winding overhang
10 second winding overhang
11 first rotor bearing
12 second rotor bearing
13 first winding overhang space
14 second winding overhang space
15 first fluid duct
16 rigid element
17 flexible element
18 centering and fixing elements
19 housing part on the first end surface
20 second fluid duct
22 inlet hole
23 output-side port of rigid element of second fluid duct
24 outflow hole
25 first rotor space
26 housing recess
27 second rotor space
28 input-side port of first fluid duct
29 input-side port of second fluid duct
30.1 stator cooling bush recess
30.2 stator cooling bush recess
30.3 stator cooling bush recess
31 outer circumference of stator cooling bush
32 external surroundings of the electric machine
33 internal combustion engine
34 transmission
35 separating clutch
36 rotor shaft
37 air circuit
38 motor vehicle
39 drive train
40 drive unit
41 prime mover
42 transmission
43 front differential gear
44 front wheel
45 front wheel
46 front axle
47 electric axle drive
48 rear differential gear
49 first rear wheel
50 first sideshaft
51 second rear wheel
52 second sideshaft
53 fan
54 first air duct
55 second air duct
56 output-side port
57 rotor air duct

The invention claimed is:

1. An electric machine (1) for driving a motor vehicle (6; 38, comprising:
    a stator (2) with at least one winding overhang (9, 10);
    a first fluid duct (15) arranged at an end surface of a first winding overhang (9) of the at least one winding overhang (9, 10) in an axial direction (x), the first fluid duct (15) configured such that cooling fluid is flowable through the first fluid duct (15) to receive heat from the first winding overhang (9); and
    a first air duct (54) arranged separated from the first fluid duct (15), the first air duct (54) configured such that air is flowable through the first air duct (54) to receive heat from the cooling fluid in the first fluid duct (15) and from the first winding overhang (9), the first air duct (54) arranged such that the air within the first air duct (54) flows over the first winding overhang (9) and over the first fluid duct (15) at the end surface of the first winding overhang (9).

2. The electric machine (1) of claim 1, further comprising a second fluid duct (20) configured such that the cooling fluid flowable in the second fluid duct (20) receives heat from a second winding overhang (10) of the at least one winding overhang (9, 10), the second fluid duct (20) arranged at an end surface of the second winding overhang (10) in the axial direction (x).

3. The electric machine (1) of claim 2, further comprising a second air duct (55) arranged separated from the second fluid duct (20), the second air duct (55) configured such that air is flowable through the second air duct (55) to receive heat from the cooling fluid in the second fluid duct (55) and from the second winding overhang (10), the second air duct (55) arranged such that the air within the second air duct (55) flows over the first winding overhang (9) and over the first fluid duct (15) at the end surface of the first winding overhang (9).

4. The electric machine (1) of claim 3, further comprising a housing (4), wherein:
    the housing (4) has an end-surface housing part (19) that at least partially closes the electric machine (1) on a first axial end surface (S1) of the electric machine (1); and
    the housing part (19) at least partially forms a portion of the first air duct (54).

5. The electric machine (1) of claim 3, further comprising a housing cover (5), wherein:
    the housing cover (5) at least partially closes the electric machine (1) on a second axial end surface (S2) of the electric machine (1); and
    the housing cover (5) at least partially forms a portion of the second air duct (55).

6. The electric machine (1) of claim 3, further comprising:
    a closed air circuit (37); and
    a fan (53) arranged within the closed air circuit (37),
    wherein the first air duct (54) and the second air duct (55) form a section of the closed air circuit (37), and
    the fan (53) is operable to induce circulation of air within the closed air circuit (37).

7. The electric machine (1) of claim 6, further comprising a rotor (3) with a rotor shaft (36), wherein:
    the air circuit (37) comprises a rotor air duct (57);
    the rotor air duct (57) extends along the rotor shaft (36) or through the rotor shaft (36) in the axial direction (x);

the rotor air duct (57) is connected to the first air duct (54) at one axial end of the rotor air duct (57) and to the second air duct (55) on the other axial end of the rotor air duct (57), air is flowable out of the second air duct (55) into the rotor air duct (57), and air is flowable out of the rotor air duct (57) into the first air duct (54); and wherein the rotor air duct (57) is configured such that the air flowable in the rotor air duct (57) receives heat from the rotor shaft (36).

8. The electric machine (1) of claim 6, further comprising a stator cooling bush (8), wherein:

the air circuit (37) comprises a stator air duct (58);

the stator cooling bush (8) surrounds the stator (2) in a radial direction (r);

the housing (4) surrounds the stator cooling bush (8) in the radial direction (r);

the stator air duct (58) extends along an outer circumference (31) of the stator cooling bush (8) in the axial direction (x);

the stator air duct (58) is connected to the first air duct (54) at one axial end of the stator air duct (58) and to the second air duct (55) at the other axial end of the stator air duct (58), air is flowable out of the first air duct (54) into the stator air duct (58), and air is flowable out of the stator air duct (58) into the second air duct (55); and the housing (4) is configured for receiving heat from the air flowable in the stator air duct (58) and for rejecting the heat to external surroundings (32) of the electric machine (1).

9. The electric machine (1) of claim 8, wherein:

the stator cooling bush (8) forms a stator fluid duct (30.1, 30.2, 30.3) separated from the stator air duct (58);

a fluid is flowable through the stator fluid duct (30.1, 30.2, 30.3) for receiving heat from the stator (2);

the stator air duct (58) is arranged between the stator cooling bush (8) and the housing (4); and the stator fluid duct (30.1, 30.2, 30.3) is configured such that the fluid flowable through the stator fluid duct (30.1, 30.2, 30.3) receives heat from the air flowable through the stator air duct (58).

10. The electric machine (1) of claim 2, wherein:

the first fluid duct (15) comprises a rigid element (16) and a flexible element (17), the rigid element (16) and the flexible element (17) jointly define the first fluid duct (15);

the flexible element (16) rests against an outer contour of the axial end surface of the first winding overhang (9); and the flexible element (17) is configured for adapting to the outer contour of the axial end surface of the first winding overhang (9).

11. The electric machine (1) of claim 2, wherein:

the second fluid duct (20) comprises a rigid element (16) and a flexible element (17);

the rigid element (16) and the flexible element (17) jointly define the second fluid duct (20);

the flexible element (17) rests against an outer contour of the axial end surface of the second winding overhang (10); and the flexible element (17) is configured for adapting to the outer contour of the axial end surface of the second winding overhang (10).

* * * * *